United States Patent [19]
Taghezout

[11] Patent Number: 5,825,106
[45] Date of Patent: Oct. 20, 1998

[54] BI-DIRECTIONAL BIPHASE ELECTROMECHANIC TRANSDUCER HAVING MULTIPOLOR MAGNETS

[75] Inventor: Daho Taghezout, Morges, Switzerland

[73] Assignee: Eta SA Fabriques d'Ebauches, Grenchen, Switzerland

[21] Appl. No.: 800,764

[22] Filed: Feb. 13, 1997

[30]  Foreign Application Priority Data

Feb. 15, 1996 [FR] France ................................. 96 01879

[51] Int. Cl.⁶ .......................... H02K 37/08; H02K 16/04
[52] U.S. Cl. ................................ 310/49 R; 310/40 MM; 310/156; 310/172; 310/254
[58] Field of Search .......................... 310/49 R, 40 MM, 310/156, 172, 254

[56]  References Cited

U.S. PATENT DOCUMENTS

| | | | |
|---|---|---|---|
| 4,680,494 | 7/1987 | Grosjean | 310/156 |
| 4,803,389 | 2/1989 | Ogawa et al. | 310/49 R |
| 5,051,633 | 9/1991 | Tu et al. | 310/49 R |
| 5,321,330 | 6/1994 | Taghezout | 310/257 |

FOREIGN PATENT DOCUMENTS

| | | | |
|---|---|---|---|
| 680 553 | 9/1992 | Switzerland | 310/49 R |
| 2 052 978 | 2/1981 | United Kingdom | 310/49 R |
| WO 85/00704 | 2/1985 | WIPO | 310/49 R |

*Primary Examiner*—Nestor Ramirez
*Assistant Examiner*—Karl Imagoshi E. Tamai
*Attorney, Agent, or Firm*—Griffin, Butler, Whisenhunt, Szipl, LLP

[57]  ABSTRACT

An electromecanic transducer comprises a stator 4 formed of three parts 6, 8 and 18 each presenting merlons or teeth 52, 54 and 60 superposed to a multipolar magnet 34 of rotor 30. Three statoric magnetic poles 10, 12 and 20 are situated in a same statoric plane and define, together with two branches 22 and 24 each containing a coil 26 and 28, two principal magnetic circuits of the transducer. The transducer is particularly suitable for a step functioning, in particular when a relatively high number of steps per turn is desired.

7 Claims, 4 Drawing Sheets

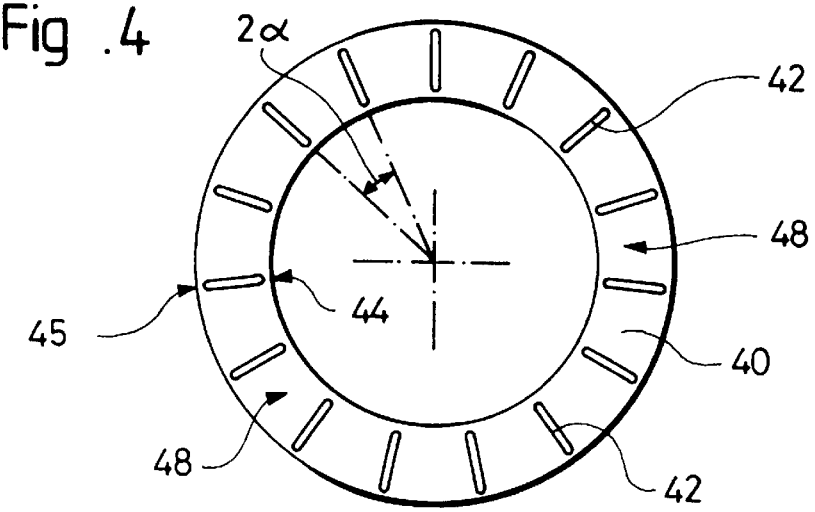
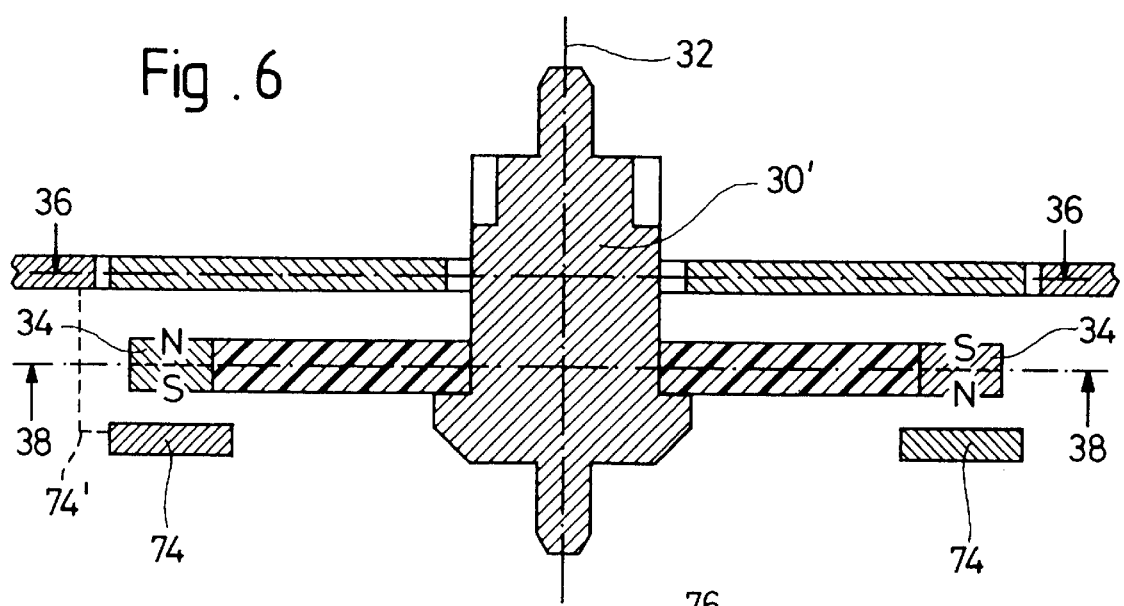
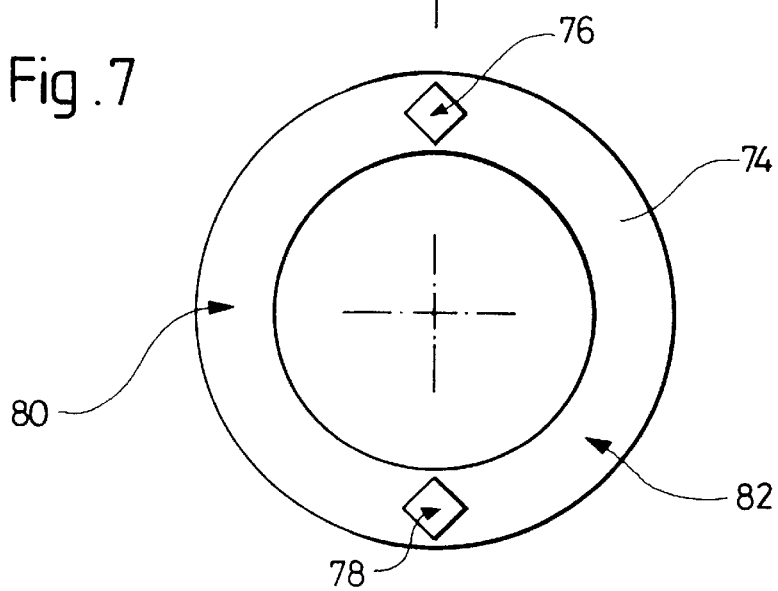

5,825,106

BI-DIRECTIONAL BIPHASE ELECTROMECHANIC TRANSDUCER HAVING MULTIPOLOR MAGNETS

FIELD OF THE INVENTION

The present invention concerns an electromecanic transducer comprising a rotor having a multipolar magnet which has an even pair of magnetic dipoles (or pairs of magnetic poles) alternatively orientated in the direction of the axis of rotation of this rotor. More specifically, the present invention concerns a bi-directional biphase transducer, a stator of which defines magnetic poles which are essentially situated in a same statoric plane.

BACKGROUND OF THE INVENTION

From document WO 85/00 704 an electromecanic transducer is known based upon the same principals as those defined hereabove and the stator of which is formed of four distinct stator parts which each define a magnetic pole of the stator. The two branches which each comprise a coil have their extremities connected respectively to different portions of the four stator parts mentioned hereabove. Two of these stator parts present respectively a first and a second circular battlement form, the merlons of which are superposed to the multipolar magnet of the rotor. Two adjacent merlons of the first and of the second battlement are angularly shifted with respect to each other at an angle which is equal to twice the central angle defined by the magnetic dipoles of the multipolar magnet, whereas any merlon of the first circular battlement is angularly shifted with respect to any merlon of the second circular battlement by (N +½) times the central angle of the dipoles of the multipolar magnet, N being a positive integer.

One of the major inconveniences of the transducer described hereabove is due to the fact that it is very difficult to assemble it in a precise and reliable manner. Indeed, the four independent statoric pieces which are imbricated two by two must be arranged precisely in a stable position with respect to each other.

Furthermore, this document does not teach a skilled person how to obtain correctly and in reliable manner a transducer of the type proposed having a high number of rotor pole pairs, for example, 24 or 30. Indeed, the skilled person does not find any satisfactory teaching of the structure of these two stator parts, designated by the reference 3, when the number of pairs of poles of the multipolar magnet increases. In particular, the arms which connect the teeth of these two parts 3 respectively to extremities B and C of the two branches 7 become very narrow, and consequently weak.

SUMMARY OF THE INVENTION

The aim of the present invention is to provide an electromecanic transducer of the type described herebefore, but having a reliable structure being less delicate to assemble. To this effect, the present invention has as object an electromecanic transducer comprising :

a stator defining statoric magnetic poles which are situated essentially in a same statoric plane;

a rotor defining an axis of rotation of the rotor and comprising a multipolar magnet presenting an even number of magnetic dipoles which are orientated alternately along said axis of rotation and which each define a first central angle, this multipolar magnet defining a rotor plane parallel to said statoric plane;

two coils arranged to be connected to an electric power supply;

said stator comprising a first branch and a second branch which each contain one of the two coils, a first and a second of said statoric magnetic poles having respectively a first and a second circular battlement the merlons of which being at least partially superposed to said multipolar magnet, two adjacent merlons of said first or second circular battlement being angularly shifted one with respect to the other by an angle which is twice said first central angle, any merlon of said first circular battlement being angularly shifted with respect to any merlon of said second circular battlement by N +½times said first central angle, N being a positive integer, said first and second branches having first extremities respectively connected to said first and second magnetic poles, characterized in that a third and final magnetic pole of said statoric magnetic poles is arranged around said axis of rotation and has at its periphery teeth which overlap said first and second circular battlement and which are superposed at least partially to said multipolar magnet, said first and second branches having their second extremities connected to said third statoric magnetic pole.

Thanks to these features of the present invention, the assembly of the electromecanic transducer is facilitated and the increase of the number of magnetic dipoles of the multipolar magnet does not lead to a more fragile structure of the transducer, as is the case in the mentioned prior art.

Other features and advantages of the present invention will be described hereinafter in a more detailed manner by way of the following description, given by way of an unlimited example thereby referring to the attached drawings in.

BRIEF DESCRIPTION OF THE DRAWINGS

FIG. 4 is a bottom view of a ring made of a magnetic material belonging to the rotor represented in FIG. 2;

FIG. 6 is a sectional view of FIG. 5 along the line VI—VI, and

FIG. 7 is a bottom view of a ring made of a magnetic material and belonging to the stator represented in FIG. 5.

DESCRIPTION OF PREFERRED EMBODIMENTS

Figure 1:
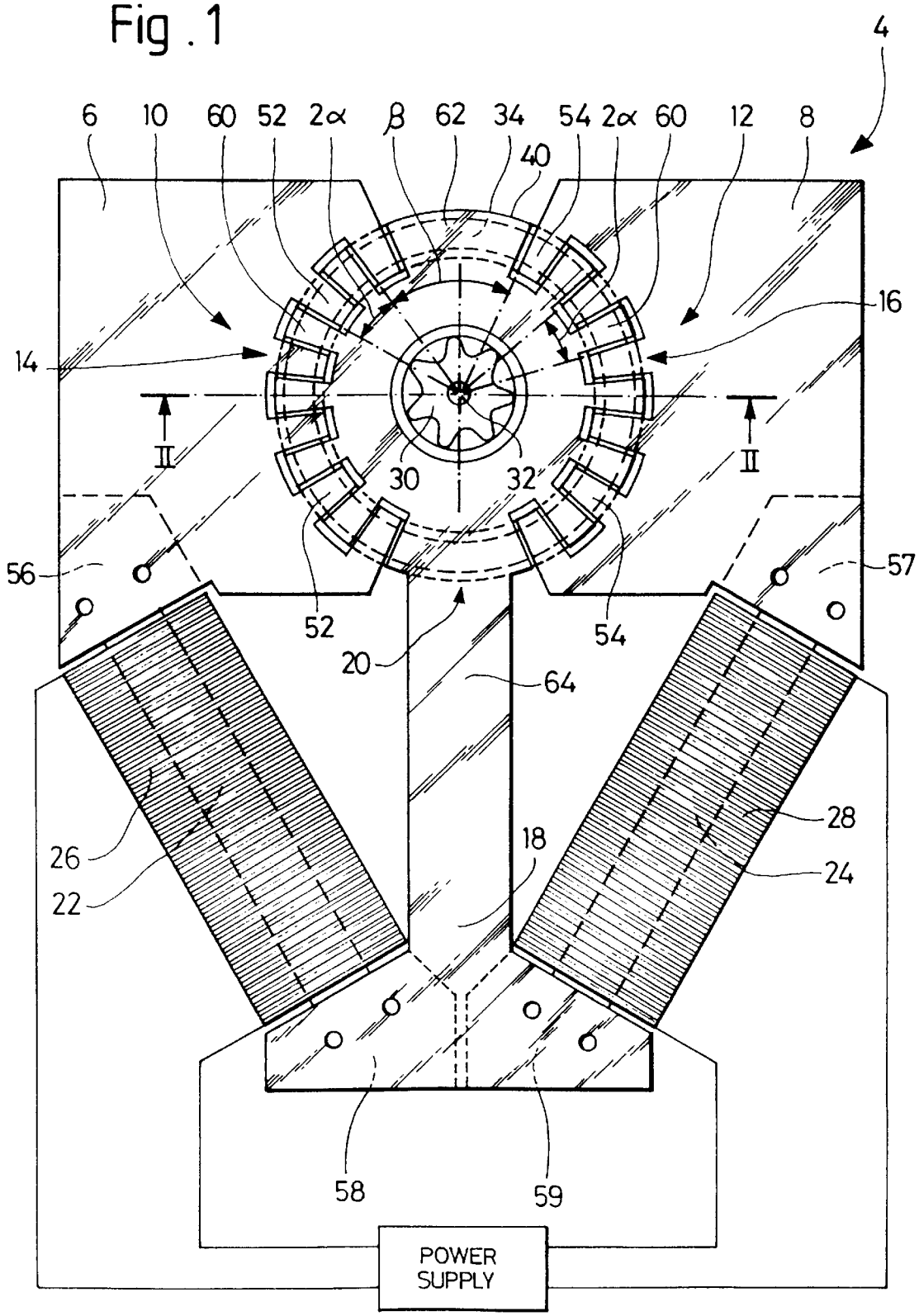
FIG. 1 is a schematic top view of a first embodiment of a transducer according to the invention.
Figure 2:
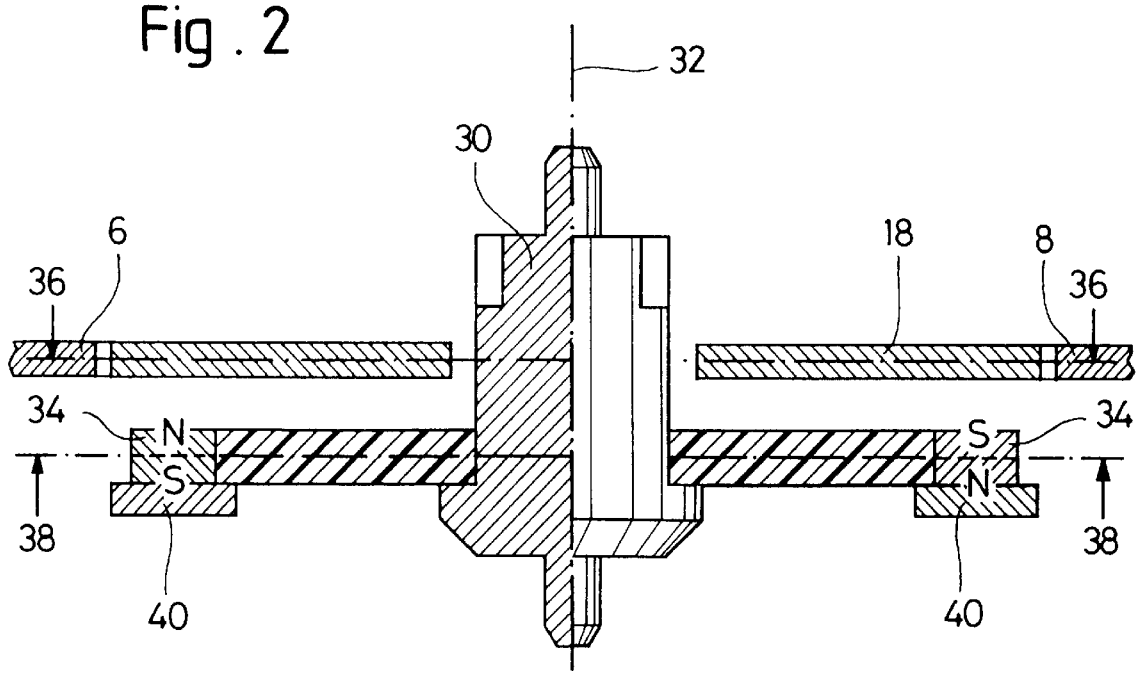
FIG. 2 is a sectional view of FIG. 1 along the line II—II.
Figure 3:
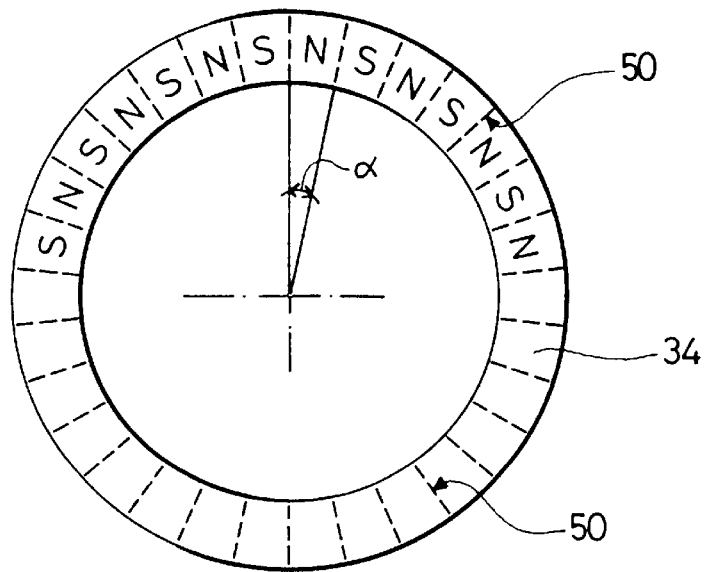
FIG. 3 is a schematic representation of the permanent magnet of the rotor of the transducer of FIG. 1.

A first embodiment of an electromecanic transducer according to the invention will be described hereafter thereby referring to FIGS. 1 to 4.

The transducer comprises a stator 4 comprising a first and a second stator part 6 and 8 respectively defining a first and a second magnetic pole 10 and 12. The first and second magnetic poles 10 and 12 comprise a first and a second circular battlement 14 and 16 respectively. The stator 4 further comprises a third stator part 18 defining a third magnetic pole 20 and comprising two branches 22 and 24 each containing a coil 26 and 28. These two coils are arranged so that they may be connected to an electric power supply (non represented) for generating magnetic fluxes in the two principal magnetic circuits defined by stator 4.

The transducer also comprises a rotor 30 defining an axis of rotation 32 and comprising an angular multipolar magnet 34 associated to a magnetic flange. This magnet comprises an even number of magnetic dipoles (or pairs of magnetic poles) alternatively orientated in the direction of axis of rotation 32. Each magnetic dipole defines a central angle α.

The three stator parts 6, 8 and 18 are located in a same statoric plane 36. According to an alternative, only magnetic poles 10, 12 and 20 are located in the same plane 36 whereas the peripheral stator parts are arranged in a manner which depends upon the requirements of the construction and upon the arrangement of the electromecanic transducer within a device which is intended to receive this transducer.

Multipolar magnet 34 of rotor 30 is situated in a rotor plane 38 parallel to statoric plane 36, at a certain distance from the latter, given the fact that the magnetic poles 10, 12 and 20 are at least partially superposed to multipolar magnet 34.

Rotor 30 further comprises a plate 40 made of a magnetic material and situated at the opposite side of statoric plane 36 with respect to multipolar magnet 34. Plate 40 has the form of a ring to which multipolar magnet 34 is superposed. This annular plate 40 comprises apertures 42, each aperture defining two isthmuses 44 and 45 constituting zones of high magnetic reluctance. These apertures 42 magnetically isolate angular sections 48 which have a central angle equal to 2α, that it to say equal to twice the value of the central angle of a magnetic dipole of multipolar magnet 34. It is to be noted that, according to an alternative embodiment, the central angle of the annular sections is equal to 3α, but it may also have another value. Preferably, apertures 42 are aligned with intermediate zones 50 of multipolar magnet 34.

Concerning the arrangement of the statoric magnetic poles 10, 12 and 20, the first circular battlement 14 and the second circular battlement 16, respectively belonging to magnetic poles 10 and 12, are formed of merlons 52 and of merlons 54. These merlons 52 and 54 are at least partially superposed to multipolar magnet 34 of rotor 30. Two adjacent merlons 52 or 54 of the first or of the second circular battlement 14 or 16 are angularly shifted with respect to each other at an angle of 2α, that it to say twice the value of central angle α. Further, any merlon 52 of first circular battlement 14 is angularly shifted with respect to any merlon 54 of second circular battlement 16 at an angle β which has a value which is, preferably, equal to (N+½) times that of central angle α, N being a positive integer. However, β may have, according to another embodiment, a value equal to (N+⅓) α or (N+⅔) α.

The first and second branches 22 and 24 have first extremities 56 and 57 directly connected to first and second magnetic poles 10 and 12 respectively, whereas the second extremities 58 and 59 are both directly connected to the third magnetic pole 20.

Third magnetic pole 20, forming a final magnetic pole of stator 4, is arranged around axis of rotation 32 of rotor 30 and has at its periphery teeth 60 which overlap with the first and second circular battlements 14 and 16. Teeth 60 are at least partially superposed to multipolar magnet 34. Between the merlons 52 of first circular battlement 14 and the merlons 54 of second circular battlement 16 are provided on the one hand an intermediate tooth 62 and an arm 64 which elongates the central portion of pole 20 so as to allow the attachment of second extremities 58 and 59 of branches 22 and 24 containing the coils 26 and 28.

It is further mentioned that the presence of intermediate tooth 62 is not absolutely necessary to the functioning of the transducer according to the invention, nevertheless it allows to, as does the part of arm 64 which is superposed to multipolar magnet 34, collect the flux generated by coils 26 and 28 and coupled to the magnetic flux of multipolar magnet 34 which passes through the merlons situated at the extremities of circular battlements 14 and 16, given the fact the presence of the apertures 42 in annular plate 40 serving as a closing plate of the used magnetic circuit of the transducer described here. Furthermore, this intermediate tooth 62 allows to define the amplitude as well as the phase of the positioning torque to maintain the permanent magnet at rest.

It is further noted that the presence of plate 40 is necessary for a correct functioning of the transducer according to the invention, because this plate 40 allows to increase the efficiency of this transducer and thus to minimize the electric energy consumption needed to provide a certain effort or work. Apertures 42 provided in plate 40 and defining angular sections 48 which are magnetically isolated one with respect to the other, allow to magnetically isolate magnetic poles 10 and 12 of the stator and thus to avoid that the leaking flux of the coils is large. This is particularly advantageous for the transducer according to the invention, given the fact that the two principal magnetic circuits of this transducer have a common magnetic pole 20.

An embodiment of the transducer according to the invention, which is in no way limitative, consists in alternatingly supplying coils 26 and 28 with an alternatingly change of polarity such as to cause the rotor to rotate in a step by step manner. With such a power supply, it will be noted that if 30 magnetic dipoles are provided at multipolar magnet 34, this will suffice to obtain 60 steps per turn of rotor 30, which is advantageous for horological applications.

Figure 5:
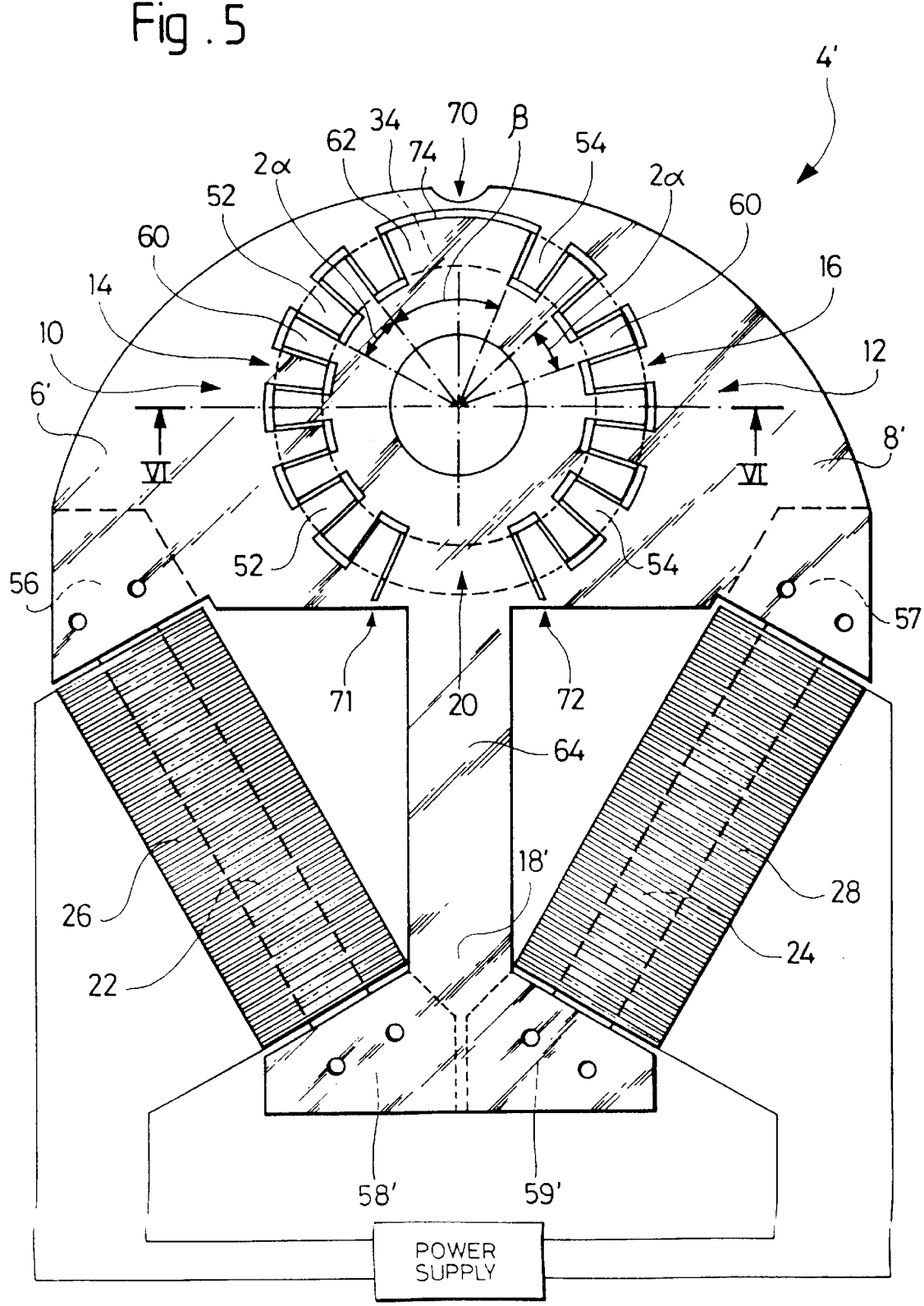
FIG. 5 is a schematic top view of a second embodiment of a transducer according to the invention.

With the help of FIGS. 5 to 7, a second embodiment of an electromecanic transducer according to the invention will be described hereafter.

References already described hereabove will not be described again in detail. It is to be noted that the rotor has not be represented in FIG. 5 so as not to crowd the drawing.

This second embodiment of the invention differs from the first embodiment described hereabove in two aspects.

Firstly, the three stator parts 6', 8' and 18' which form statoric magnetic poles 10, 12 and 20 respectively, are materially connected together in such a way as to form a one and single piece. Stator parts 6', 8' and 18' are connected together by way of isthmuses 70, 71 and 72 forming zones of high magnetic reluctance, thus magnetically isolating the magnetic poles 10, 12 and 20. The arrangement of circular battlements 14 and 16, as well as the arrangement of the teeth 60 of magnetic pole 20 are similar to those of the first embodiment.

Secondly, this second embodiment differs from the first embodiment in that there is provided an annular plate or ring 74 situated on the opposite side of statoric plane 36 with respect to multipolar magnet 34 of rotor 30'. This ring 74 replaces ring 40 of the first embodiment. Ring 74, which is also formed of a magnetic material, is at least partially superposed to multipolar magnet 34 and is fixedly arranged with respect to stator 4', as indicated dashed line 74'. Annular plate 74 comprises two apertures 76 and 78 which serve to magnetically isolate two sections 80 and 82 of ring 74. This ring 74 is arranged with respect to stator 4' in such a way that the annular segments 80 and 82 are superposed to circular battlements 14 and 16 respectively. Thus, the apertures 76 and 78 serve to magnetically isolate the magnetic poles 10 and 12.

It is noted that ring 74 allows to increase the efficiency of the electromecanic transducer according to the invention and further also allows to diminish the attraction which is excerced by the magnetic poles 10, 12 and 20 on multipolar magnet 34.

The functioning of the electromecanic transducer according to the second embodiment is similar to that of the first embodiment described hereabove.

What is claimed is:

1. An electromecanic transducer comprising:

a stator defining statoric magnetic poles which are situated essentially in a same statoric plane;

a rotor defining an axis of rotation of the rotor and comprising a multipolar magnet presenting an even number of magnetic dipoles which are orientated alternately along said axis of rotation and each defining a first central angle, said multipolar magnet defining a rotor plane parallel to said statoric plane;

two coils arranged to be connected to an electric power supply;

said stator comprising a first branch and a second branch which each contain one of the two coils, a first and second of said statoric magnetic poles having respectively a first and a second circular battlement being formed of merlons, said merlons being at least partially superposed to said multipolar magnet, two adjacent merlons of said first or second circular battlement being angularly shifted one with respect to the other by an angle which is twice said first central angle, any merlon of said first circular battlement being angularly shifted with respect to any merlon of said second circular battlement by N+½times said first central angle, N being a positive integer, said first and second branches comprising first and second extremities, said first extremities being respectively connected to said first and second magnetic poles, wherein a third and final magnetic pole of said statoric magnetic poles is arranged around said axis of rotation and has at its periphery, teeth which overlap said first and second circular battlements and which are superposed at least partially to said multipolar magnet, said first and second branches having their said second extremities connected to said third statoric magnetic pole.

2. A transducer according to claim 1, and further comprising a magnetic plate formed of a magnetic material and situated on the opposite side of said rotor plane from said statoric plane, said magnetic plate being at least partially superposed to said multipolar magnet and being rotationally fixed to said rotor.

3. A transducer according to claim 2, wherein said magnetic plate is an annular plate having apertures arranged to magnetically isolate annular sections which have a central angle equal or superior to twice said first central angle.

4. A transducer according to claim 1, and further comprising a magnetic plate situated on the opposite side of said rotor plane from said statoric plane, said magnetic plate being at least partially superposed to said multipolar magnet and being arranged fixedly with respect to said stator.

5. A transducer according to claim 4, wherein said magnetic plate is annular and has two apertures, magnetically isolating two annular sections which are at least partially superposed to respectively said first and said second circular battlement.

6. A transducer according to claim 1, wherein said first, second and third statoric magnetic poles are formed of a same and single piece defining three isthmuses of high magnetic reluctance magnetically isolating said statoric poles.

7. A transducer according to claim 1, wherein the number of dipoles of said multipolar magnet is equal to thirty, said electric power supply being arranged so as to cause said rotor to rotate at sixty steps per turn by powering alternatively the two coils.

* * * * *